United States Patent
Hagihara et al.

(10) Patent No.: US 7,308,113 B2
(45) Date of Patent: *Dec. 11, 2007

(54) METHOD OF DETECTING AND MEASURING A MOVING OBJECT AND APPARATUS THEREFOR, AND A RECORDING MEDIUM FOR RECORDING A PROGRAM FOR DETECTING AND MEASURING A MOVING OBJECT

(75) Inventors: Yoshinobu Hagihara, Yokohama (JP); Hirokazu Amemiya, Ebina (JP); Tadashi Yamamitsu, Zama (JP)

(73) Assignee: Hitachi, Ltd., Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 11/212,512

(22) Filed: Aug. 24, 2005

(65) Prior Publication Data

US 2006/0002588 A1 Jan. 5, 2006

Related U.S. Application Data

(63) Continuation of application No. 09/919,734, filed on Jul. 31, 2001, now Pat. No. 6,963,658.

(30) Foreign Application Priority Data

Sep. 27, 2000 (JP) .............................. 2000-294283

(51) Int. Cl.
*G06K 9/00* (2006.01)
(52) U.S. Cl. ..................... 382/103; 348/154; 356/27
(58) Field of Classification Search ................ 382/103, 382/104, 107, 100; 348/154, 155; 356/27, 356/28
See application file for complete search history.

(56) References Cited

U.S. PATENT DOCUMENTS

| | | | | |
|---|---|---|---|---|
| 4,160,522 | A | | 7/1979 | Dikinis |
| 4,459,487 | A | * | 7/1984 | Leser ..................... 250/559.22 |
| 5,721,692 | A | * | 2/1998 | Nagaya et al. .............. 345/475 |
| 5,771,485 | A | * | 6/1998 | Echigo ........................ 701/119 |
| 6,005,493 | A | * | 12/1999 | Taniguchi et al. ........... 340/990 |
| 6,584,211 | B1 | * | 6/2003 | Amemiya et al. ........... 382/103 |
| 6,654,481 | B2 | * | 11/2003 | Amemiya et al. ........... 382/103 |
| 6,766,038 | B1 | * | 7/2004 | Sakuma et al. ............. 382/107 |
| 6,963,658 | B2 | * | 11/2005 | Hagihara et al. ........... 382/107 |
| 2005/0008194 | A1 | * | 1/2005 | Sakuma et al. ............. 382/104 |

FOREIGN PATENT DOCUMENTS

| | | |
|---|---|---|
| JP | 08-221577 | 8/1996 |
| JP | 11-134506 | 5/1999 |

* cited by examiner

*Primary Examiner*—Bhavesh M Mehta
*Assistant Examiner*—Anand Bhatnagar
(74) *Attorney, Agent, or Firm*—Townsend and Townsend and Crew LLP

(57) ABSTRACT

There are provided a plurality of units for detecting a moving object in an image from changes of an image structure in a monitor area defined in a linear strip on a single straight line consisting of a base line and its partitions, and a height of a moving object is detected and measured easily and accurately from a code obtained from detection results obtained when the image structure is at its maximum variation.

3 Claims, 15 Drawing Sheets

| SLIT NO. | DEFINED RANGE | HEIGHT INFORMATION | | | | | |
|---|---|---|---|---|---|---|---|
| | | BEFORE PASSING | UNDER 1.6m | 1.6m~ UNDER 1.7m | 1.7m~ UNDER 1.8m | 1.8m~ UNDER 1.9m | 1.9m AND OVER |
| V0 | 0.0~2.0m | 0 | 1 | 1 | 1 | 1 | 1 |
| V1 | 0.0~1.6m | 0 | 1 | 1 | 1 | 1 | 1 |
| V2 | 1.6~1.7m | 0 | 0 | 1 | 1 | 1 | 1 |
| V3 | 1.7~1.8m | 0 | 0 | 0 | 1 | 1 | 1 |
| V4 | 1.8~1.9m | 0 | 0 | 0 | 0 | 1 | 1 |
| V5 | 1.9~2.0m | 0 | 0 | 0 | 0 | 0 | 1 |
| MEASUREMENT CODE | | 000000 | 110000 | 111000 | 111100 | 111110 | 111111 |

0 : BEFORE ENTRY    1 : ENTRY

| SLIT NO. | DEFINED RANGE | BEFORE PASSING | HEIGHT INFORMATION | | | | |
|---|---|---|---|---|---|---|---|
| | | | UNDER 1.6m | 1.6m~ UNDER 1.7m | 1.7m~ UNDER 1.8m | 1.8m~ UNDER 1.9m | 1.9m AND OVER |
| V0 | 0.0~2.0m | 0 | 1 | 1 | 1 | 1 | 1 |
| V1 | 0.0~2.0m | 0 | 1 | 1 | 1 | 1 | 1 |
| V2 | 1.6~2.0m | 0 | 0 | 1 | 1 | 1 | 1 |
| V3 | 1.7~2.0m | 0 | 0 | 0 | 1 | 1 | 1 |
| V4 | 1.8~2.0m | 0 | 0 | 0 | 0 | 1 | 1 |
| V5 | 1.9~2.0m | 0 | 0 | 0 | 0 | 0 | 1 |
| MEASUREMENT CODE | | 000000 | 110000 | 111000 | 111100 | 111110 | 111111 |

0 : BEFORE ENTRY    1 : ENTRY

SLIT

BACKGROUND SLIT

CHANGES IN SLIT PROFILE WHEN THE IMAGE IS DARKENED BY SHADOW OR THE LIKE

FIG. 14A  SLIT IMAGE EXPRESSED BY VECTOR NOTATION
$$V = (P_1, P_2, P_3 \cdots\cdots\cdots\cdots\cdots\cdots, P_N)$$
1401
FIG. 14B  SLIT IN VECTOR SPACE
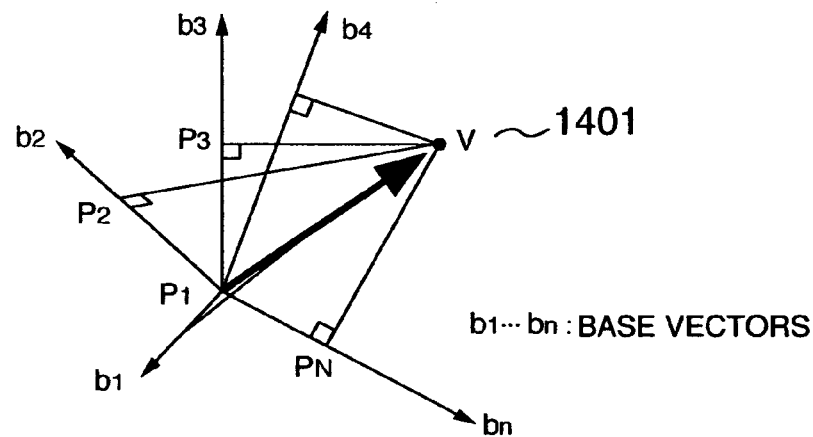
$b_1 \cdots b_n$ : BASE VECTORS
FIG. 14C  CHANGES IN SLIT VECTORS WHEN THE IMAGE IS DARKENED BY SHADOW OR LIKE
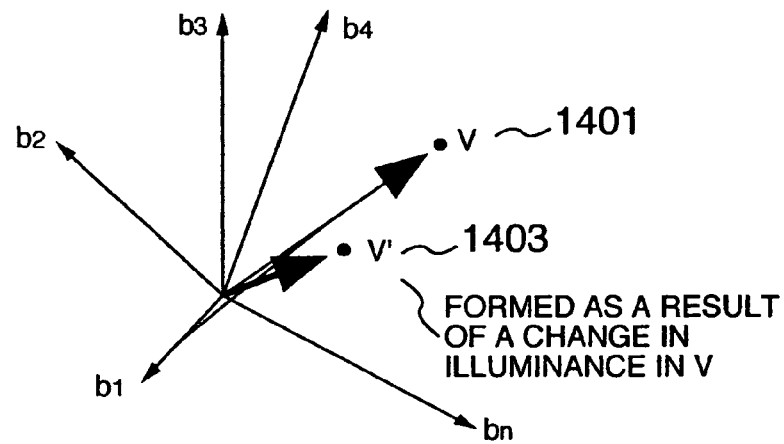
FORMED AS A RESULT OF A CHANGE IN ILLUMINANCE IN V

METHOD OF DETECTING AND MEASURING A MOVING OBJECT AND APPARATUS THEREFOR, AND A RECORDING MEDIUM FOR RECORDING A PROGRAM FOR DETECTING AND MEASURING A MOVING OBJECT

CROSS-REFERENCE TO RELATED APPLICATION(S)

This is a continuation of U.S. application Ser. No. 09/919,734, filed on Jul. 31, 2001 now U.S. Pat. No. 6,963,658, and entitled "Method of Detecting and Measuring a Moving Object and Apparatus Therefor, and a Recording Medium for Recording a Program for Detecting and Measuring a Moving Object" which application claimed priority from Japan Patent Application No. 2000-294283, filed Sep. 27, 2000.

BACKGROUND OF THE INVENTION

The present invention relates to an accident and crime preventive technique for measuring the height of vehicles at the entrances of parking lots, measuring the height of people going on board vehicles, and monitoring shops and roads, also relates to a method and apparatus for detecting and measuring moving objects for analysis of images taken by cameras, and further concerns a recording medium for recording a program for detecting and measuring a moving object.

Investigations are being made to impose height limits for cars and human beings at the entrances of parking lots or at the doors of wagons in the amusement parks, etc. A criminal's height is judged by visual measurement from ex post facto images recorded by time plus video recorders for surveillance in convenience stores and so on. Further, In addition to the admission regulations in terms of height, there are vehicle admission regulations for narrow road widths.

In the parking lots, poles and sign boards are provided, which limit the height of entering vehicles. At the entrance to a parking lot, when the car contacts the height-limiting pole, for example, a warning is given to the driver, or information is supplied to the attendant to make a decision to refuse admission or to designate another parking area. At the entrance to vehicles in an amusement park, there is sometimes what may be called a height check board having a hole in the shape of a human being to limit the height of people going on board, and by comparing with a height comparison-purpose panel, a warning is issued to a person concerned or information is supplied for the attendant to refuse admission for security reasons. In convenience stores, there is a color-classified height measuring tape at the exit, the customers are monitored at all times by a monitor camera and a time plus video recorder. After an incident has occurred, the height of a criminal is determined by visual measurement from the recorded images. On narrow-width roads, there are signs prohibiting the entrance of vehicles or large-sized vehicles. The comparison-purpose panels, stickers, and road signs are intended to preclude incidents or gather information by measuring the height or the width of objects, which are going to enter, in specified places (hereafter referred to as moving objects). Under present circumstances, however, analysis of image records has to rely on visual inspection or decision by a human being for technical reasons. Therefore, there has been demand for automated measuring process using a computer, and various methods have been proposed.

As a method for detecting a moving object, there has been proposed "Apparatus and Method for Detecting and Extracting a Moving Body" in JP-A-8-221577. This method realizes detection and extraction of the feature of a moving object against a complicated background and also realizes a reduction in image processing time. Referring to FIG. 2, this method will be described in the following.

In FIG. 2, frame images F1 (241) to F7 (245) are the frame images of the images taken at time T1 (221) to T5 (225). A segment S (231) in the frame image in FIG. 2 is designated as that area of the input image to which attention is directed in monitoring, and this area of interest is hereafter referred to as a slit. Reference numerals 201 through 205 in FIG. 2 denote slices of images at the slit (hereafter referred to as slit images) and a background image taken at time T1 (221) through time T5 (225). In this example, the image of the area of interest in monitoring when no moving object is not being captured by the camera is set as the background image at the start of processing.

In this method, the following steps are carried out on each frame image. (1) Slit images and the corresponding portions of the background images in a specific frame are extracted, (2) an extent of variation in the image structure of the slit image and the background image is obtained, (3) when the amounts of structure variation in those images are viewed as time series, if the image structure variation appears in the form of waves, it is decided that there is a moving object, and (4) when the image structure variation is flat without showing any change, it is decided that the background with no moving object superposed is shown.

The step (3) will be described using a sequence of frame images in FIG. 2. When an object moves across the slit as in this example, the image structure variation appears in a wavy pattern as shown in the image structure change graph (211) in FIG. 2.

The image structure variation here is a measure by which to indicate to what extent the structure of an object, such as the position or shape of an object in the image, has changed. The image structure variation is a feature quantity not affected by illuminance, and differs from an image variation representing a variation in pixels in the image. The method of calculating the image structure variation will be described in detail later on.

Before an object comes into the slit (time T1 (221)), the image at the slit and the corresponding portion of the background image are almost the same (201), the image structure variation is little. Then, when the object starts to cross the slit (time T2 (222)), the slit image differs from the background image (202), and image structure variation becomes large. Finally, when the object has passed through the slit (time T3 (223)), the image structure variation returns to a small value. As an object passes through the slit, the image structure variation changes in a wavy pattern. Therefore, to find a moving object, it is only necessary to observe the image structure variation as a time series and find a change in an upward convex form. In this example, to recognize this upward convex change, the moment when the image structure variation exceeds a threshold value a (213) and the moment when it falls below the threshold value a (213) are used.

The step (4) mentioned above will be described using the sequential frame images shown in FIG. 2. If a baggage (252) is left to stand about the slit as in this example (time T4 (224)), the image structure variation is large at first, but because the baggage (252) is at a standstill, the image structure variation remains unchanged at a high level (from time T4 (224) till time T5 (225)). In this method, when the value of the image structure variation has been small for more than a fixed time period as in this example, the background is changed automatically by using the slit image at this point in time as the background.

Lastly, the method for calculating the image structure variation in the step (2) will be described with reference to FIGS. 13A, 13B, 13C, 14A, 14B, 14C and 15. FIGS. 13A, 13B and 13C show the effects that the changes in illuminance have on the slit images. Let us consider a slit 1301, in which the illuminance of each pixel is expressed by P1 ... PN as shown in FIG. 13A. If we draw a graph in which the vertical axis indicates the positions of the pixels and the horizontal axis indicates the illuminance of the pixels, we have a graph of a slit image 1305 in FIG. 13B. Supposing the slit image 1301 as a whole becomes dark due to a sudden change in illuminance, such as by a shadow, the graph 1301 undergoes a uniform decrease from 1305 to 1307 while retaining the relative illuminance levels among the pixels P1 through PN as shown in FIG. 13C. This change in illuminance can be illustrated as shown in FIGS. 14A, 14B and 14C by expressing the slit image by vector notation.

As shown in FIG. 14A, the slit image can be regarded as a vector V (1401) made up of unit vectors, which represent the illuminance of the pixels. If base vectors of the pixels P1 through PN are designated as b1, b2, b3 ... bn, the vector (1401) can be expressed as a point in a n-dimensional vector space as in FIG. 14B. Then, let us suppose that a shadow fell over the slit image and the illuminance changed suddenly, with a result that the slit vector V (1401) changed to a slit vector V' (1403) as shown in FIG. 14C. At this time, from observations of FIG. 3, the changed slit vector V' (1403) can be considered to be almost on the same segment as the vector V (1401) and also considered to be a scalar multiple of the vector V (1401). The slit vector V' (1403), formed as a result of a change in illuminance in the original slit vector V 1401, remains in almost the same direction even though the slit vector V' (1403) is located at coordinates greatly different from the coordinates of the vector V (1401) in the vector space. In contrast, a slit vector, which has undergone a structural change, is considered to be different not only in coordinate values but also in direction. Therefore, to differentiate a change in illuminance from a change in structure in the slit image 1301, it is only necessary to know whether there is a change in the direction of the vector.

FIG. 15 shows an ordinary slit vector V (1401) and the slit vector V' (1403) affected by a change in illuminance, and their projected shadows on a unit sphere. As shown in FIG. 15, the distance PQ between a projected vector P (1501) on the unit sphere as a shadow of the vector V (1401) and a projected vector Q (1503) on the unit sphere as a shadow of the vector V' (1403) is much closer to each other than the original distance VV'. What occurred in the two slit images, which differentiates one from the other, that is, whether a difference occurred due to a change in illuminance or a structural change, can be decided by finding whether or not the distance between the projected vectors on the unit sphere is very small. The normalized distance between the vectors is hereafter referred to as a normalized distance. By using the normalized distance, the degree in which a structural change occurred in an objet in an image can be obtained. In this method, the image structure variation is used in detection of a moving object in the step (3) or in detection and automatic changing of the background image as mentioned in the description of the step (4). Thus, at the time of changeover of the lighting condition from day to night or night to day or under the condition that an object is placed at the background position, which has conventionally made monitoring difficult, it becomes possible to correctly decide whether there is a moving object, whether there is a new background or whether the change is merely by a shadow.

The outline of "Apparatus and Method for Detecting and Extracting a Moving Object" has been described. In this method, a segment can be used as an area of interest to be monitored; therefore compared with the conventional method, which uses the whole screen image as an area of interest, it becomes possible to greatly reduce time for calculation of the image structure variation. Further, in this method, by monitoring changes on the time base of the image structure variation, it is possible to find timing for changing the background and therefore even in places where the background is likely to be changed, as in taking pictures outdoors, a monitor process can be applied. In this method, because image variations as difference amounts of the pixels are not used but degrees of structural change in the object in the image are used, the background and the moving object can be distinguished from each other even when the lighting condition is changed or a structural change occurred in the background image.

Further, "Apparatus and Method for Detecting and Extracting a Moving Object by Using Combined Information" have been disclosed in JP-A-11-134506. In this method, there have been provided a plurality of areas of interest used in the moving object detecting apparatus, and the position and the size of a moving object are decided from a combination of some pieces of moving object detection information captured by the lattice-type monitoring areas. This method will be described with reference to FIG. 3.

In FIG. 3, the vertical position and the horizontal position of a moving object 341 in an input TV screen image 300 are detected by using a group of slits (311 through 315 and 321 through 324) arranged in a lattice form. This group of slits are formed by arranging a group of vertical slits, arranged like vertical lines, such as slit V1 (311), slit V2 (312), slit V3 (313), slit V4 (314) and slit (315), so as to be perpendicular to a group of horizontal slits, arranged like horizontal lines, such as slit H1 (321), slit H2 (322), slit H3 (323) and slit H4 (324). The vertical slits are arranged in parallel spaced apart by a distance of Lw (332). Similarly, the horizontal slits are arranged in parallel spaced apart by a height of Lh (331).

In FIG. 2, while the image structure variation is higher than the threshold value a (213), specifically, an interval from time T2 (222) till time T3 (223) and an interval on and after time T4 (224), moving object detecting means continues issuing a moving object detection event (for example, if there are 30 picture frames per second, those frames are checked one frame after another to see if there is a moving object. While the image structure variation is higher than the threshold value, a signal indicating that a moving object is detected continues being issued.)

As a slit identifier of moving object detection information, character strings indicating names of the slits, such as "V1", "V2", "H1" and "H4", are set to identify each of the slits shown in FIG. 3.

Description will now be made of a method for deciding the size of a moving object by using the slits mentioned above. In FIG. 3, in the case of a moving object 341, the vertical slits V2 (312) and V3 (313) and the horizontal slits H2 (322) and H3 (323) are detected. Among the vertical slits, the slit V1 (311) at the left of the slit V2 (312) and the slit V4 (314) at the right of the slit V3 (313) are not detected.

Among the horizontal slits, the slit H1 (321) above the slit H2 (322) and the slit H4 (324) below the slit H3 (323) are not detected. The width of the moving object is known to be greater than the width Lw (332) according to the detected vertical slits V2 (312) and V3 (313) and less than twice the width Lw (332) according to the vertical slits V1 (311) and V4 (314) not detected. The height of the moving object is known to be greater than the height Lh (331) according to the detected horizontal slits H2 (322) and H4 (324) and less than twice the height Lh (331) according to the horizontal slits H1 (321) and H4 (324) not detected.

Description has been made of the outline of "Apparatus and Method for Detecting and Extracting a Moving Body by Using Combined Information" by which to decide the size of the moving object. In this method, the height, width and position of a moving object is determined by using a combination of multiple pieces of information obtained from input images captured by a lattice-type moving object detecting means. With this method, because decisions are made on the time base, it is possible to keep track of a moving object on the input TV screen image.

SUMMARY OF THE INVENTION

When the above-mentioned prior art is put into practice in a simple way, there are problems as follows. The first problem is that depending on the shape of a moving object, it may occur that it is impossible to decide when to measure an effective height for a moving object to pass the area of interest. The second problem is that when the height is to be measured with high accuracy by defining a plurality of areas of interest in a lattice form and using a combination of measurement results obtained, it is necessary to define many areas of interest in a lattice form, so that it takes time to make a decision by using a combination of measurement results.

As means that constitute the present invention, there are provided a means for receiving video images and other pictorial images from outside and a plurality of means for defining an object under detection on a single straight line, consisting of a base line and its partitions (division lines), in an input video image or a pictorial image and detecting a moving object. Further, a moving object measuring and deciding means is provided, which encodes a moving object detection result output from the detecting means and compares this code of detection result with a preset measurement code to decide presence or absence of a moving object. Also provided is a means for outputting a decision result to outside. By this arrangement, the height and so on of a moving object can be measured.

BRIEF DESCRIPTION OF THE DRAWINGS

FIGS. 14A, 14B and 14C are examples of diagrams showing the effects of changes in illuminance on the slit vectors when the slit images are expressed by vector notation.

DESCRIPTION OF THE EMBODIMENTS

The embodiments will be described in the following.

Description will start with an example of a means for deciding and measuring apparatus.

Figure 1:
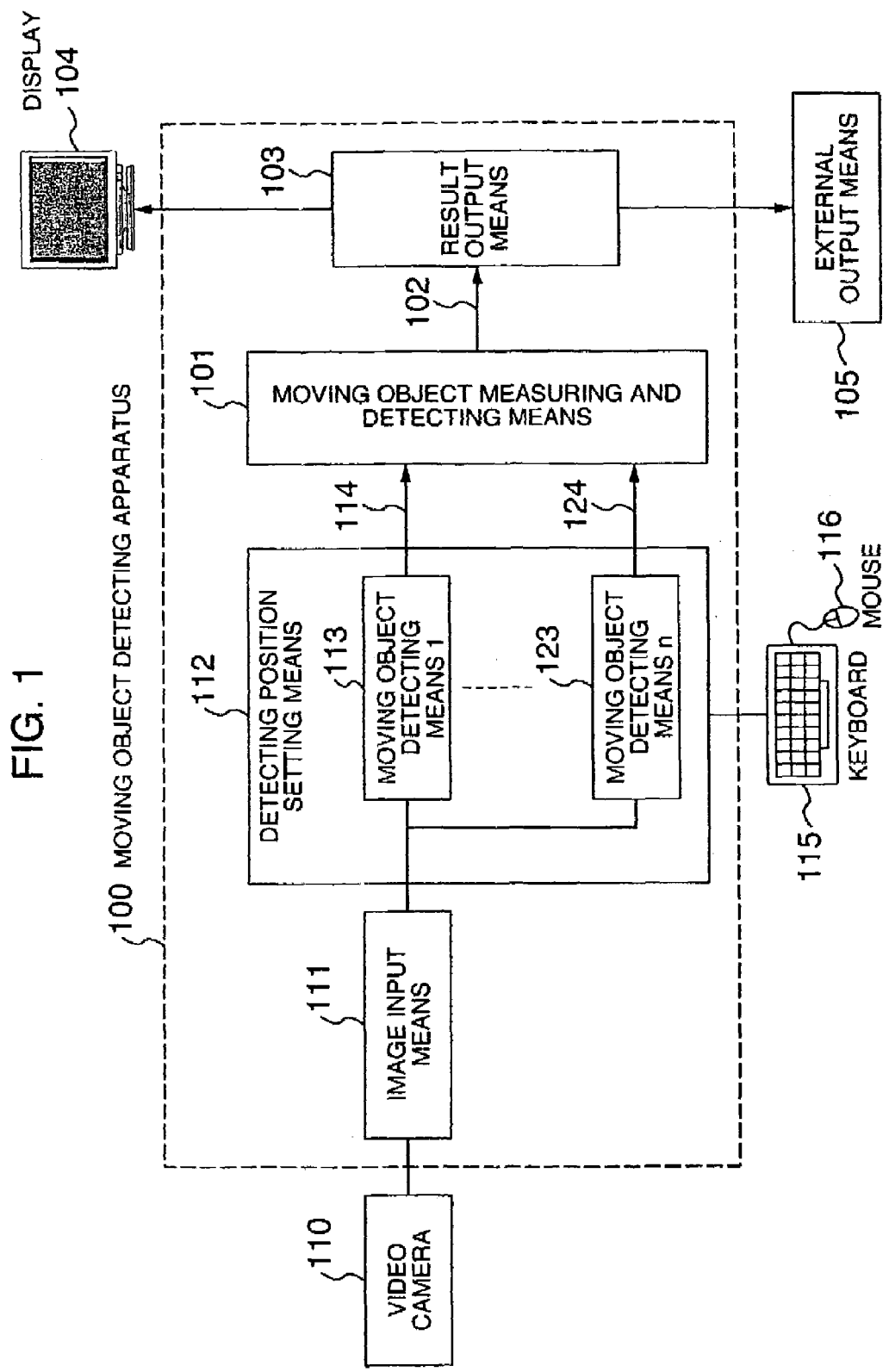
FIG. 1 is an example of block diagram of a moving object detecting and measuring apparatus.
Figure 4:
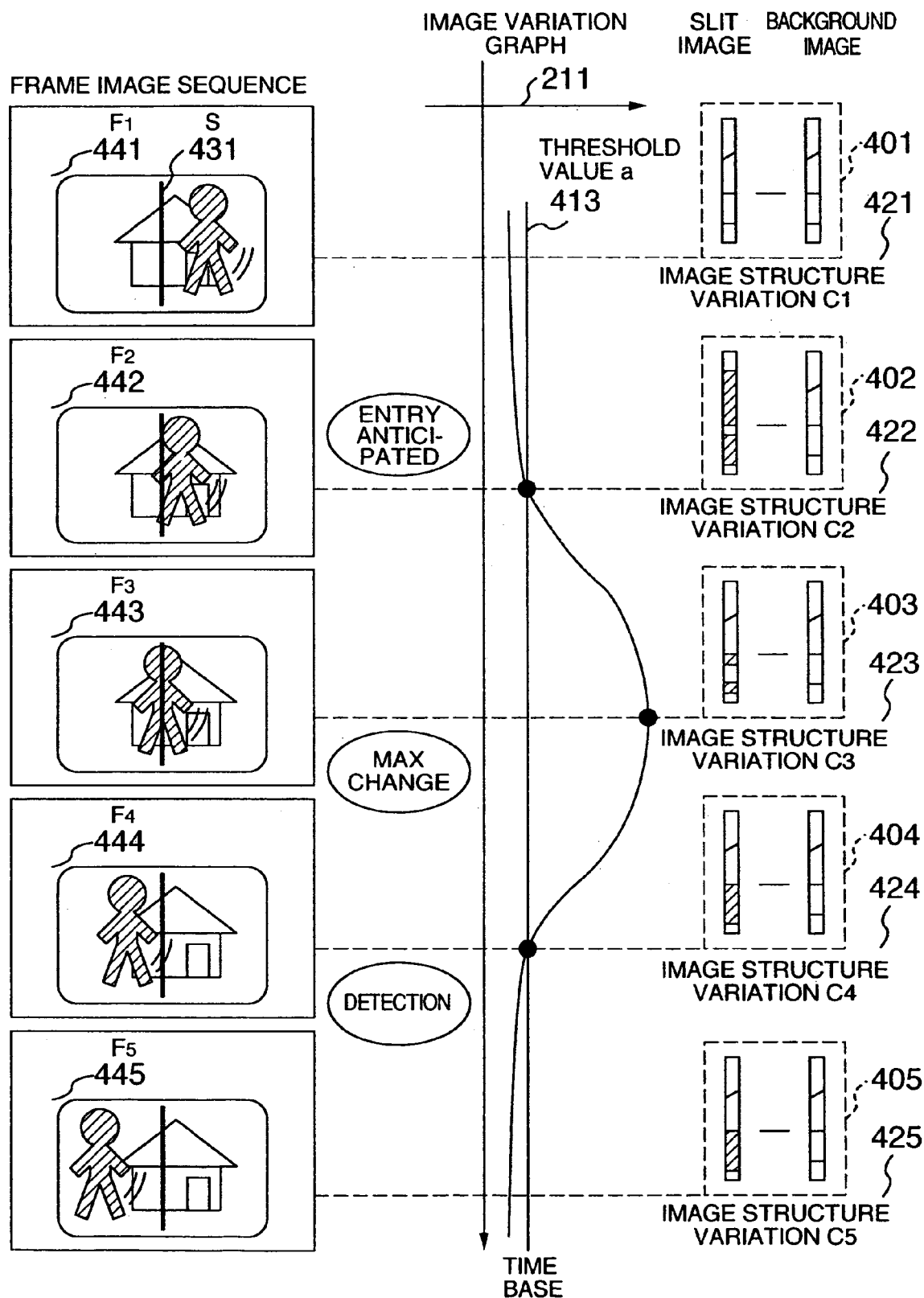
FIG. 4 shows an example of an image structure maximum variation method in the moving object detection means.
Figure 5:
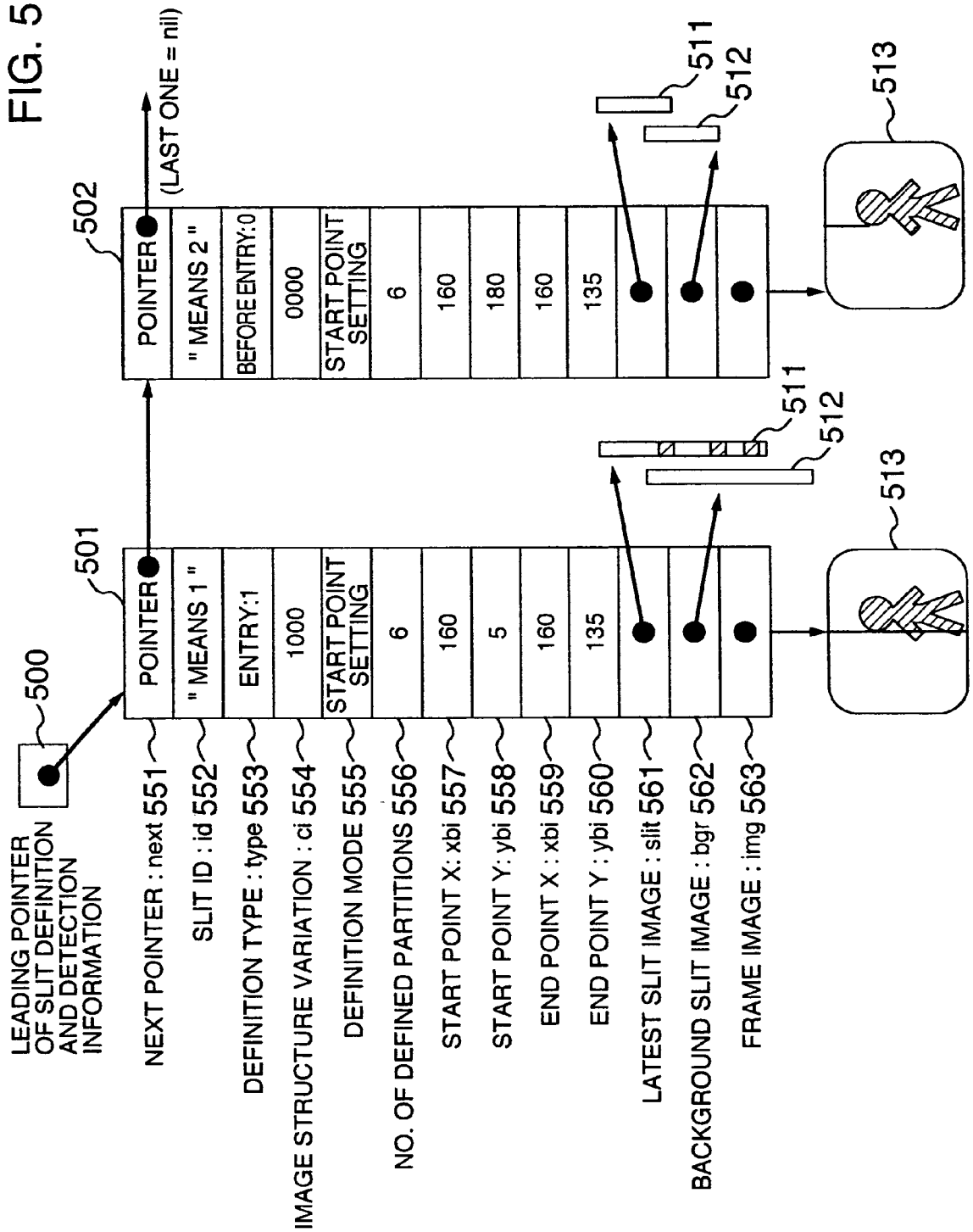
FIG. 5 shows an example showing how slit detection information is formed.
Figure 6:
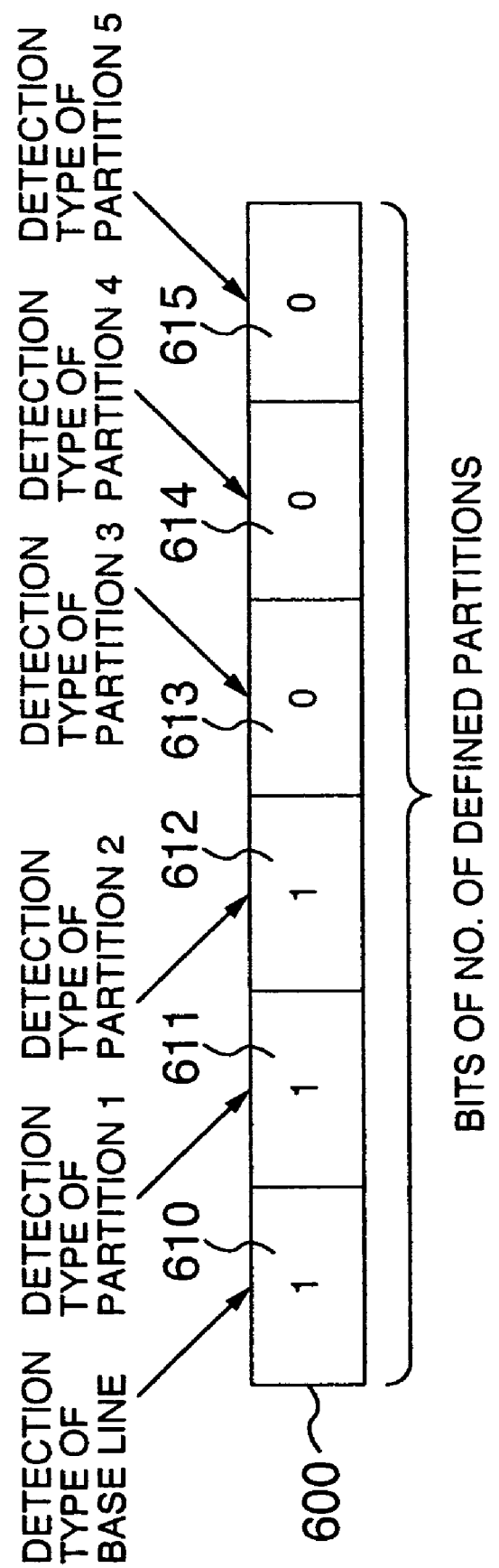
FIG. 6 shows an example showing how to define a measurement code.
Figure 7:
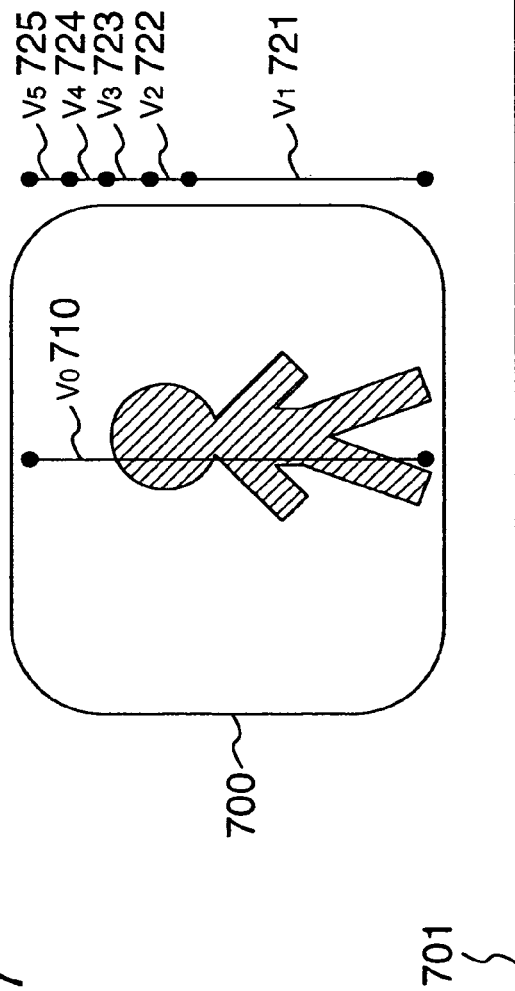
FIG. 7 shows an example showing how to define a slit and how to generate a measurement code from detection information.
Figure 8:
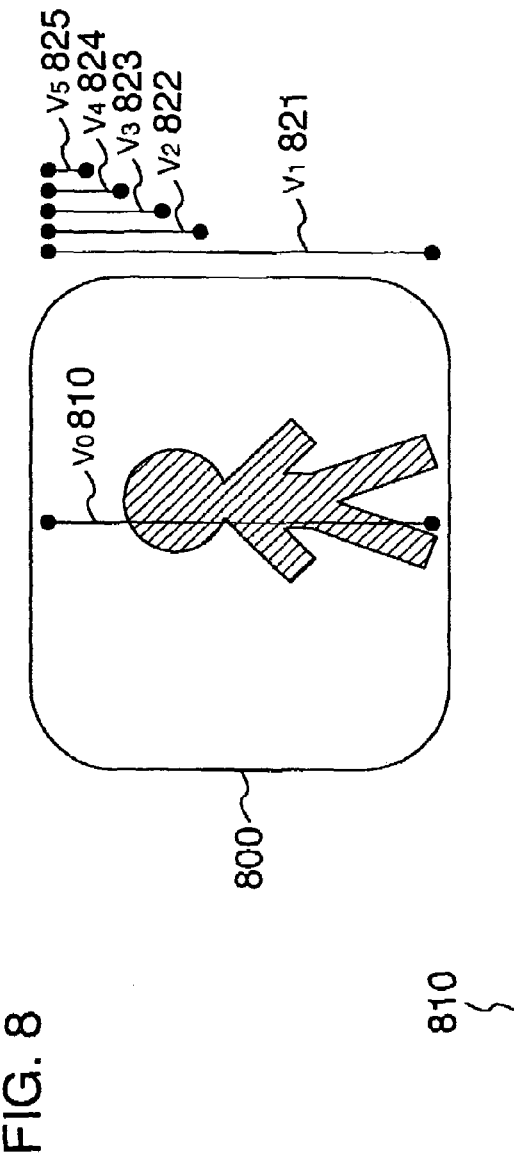
FIG. 8 shows another example showing how to define a slit and how to generate a measurement code from detection information.
Figure 9:
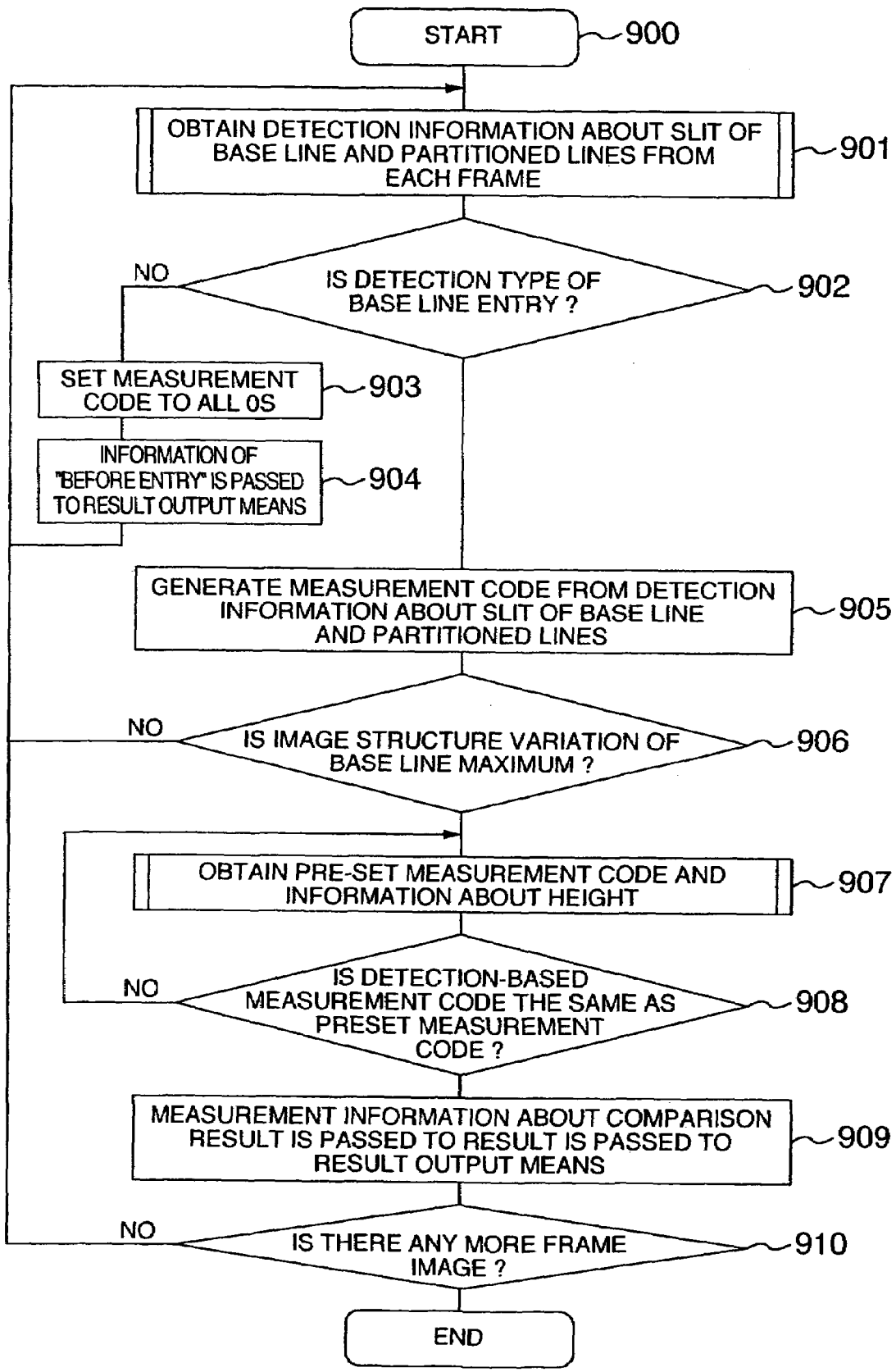
FIG. 9 is a flowchart showing an example of a process of measuring the height of a moving object from information from the base line and its partitions.

FIG. 1 is a block diagram the moving object detecting and measuring apparatus. FIG. 4 shows an example of changes in the image structure variation from predicted entry until after entry in detection at the base line. FIG. 5 shows an example of a sequence of slit definition and detection information used in the moving object detecting means. FIG. 6 shows an example of a measurement code table used in the means for coding a detection result. FIGS. 7 and 8 show examples of means for defining video images on the same line serving as the base line and its partitions (division lines). FIG. 9 shows an example of a procedure for coding detection results at the base line and its partitions in a frame when the image variation is at its greatest value in a time span from when a moving object is going to enter the slit till its entry during detection at the base line and comparing a code of the detection result with a preset measurement code to make a decision.

Referring also to other figures, description will be made of the structure of the moving object detecting and measuring apparatus (100) in FIG. 1 as one embodiment of the present invention, which can be realized in actuality by a computer.

The moving object detecting and measuring apparatus (100) is formed by the following means. An image input means (111) performs a function to read into the moving object detecting and measuring apparatus (100) images generated by an image generating means formed by a video camera (110).

Figure 2:
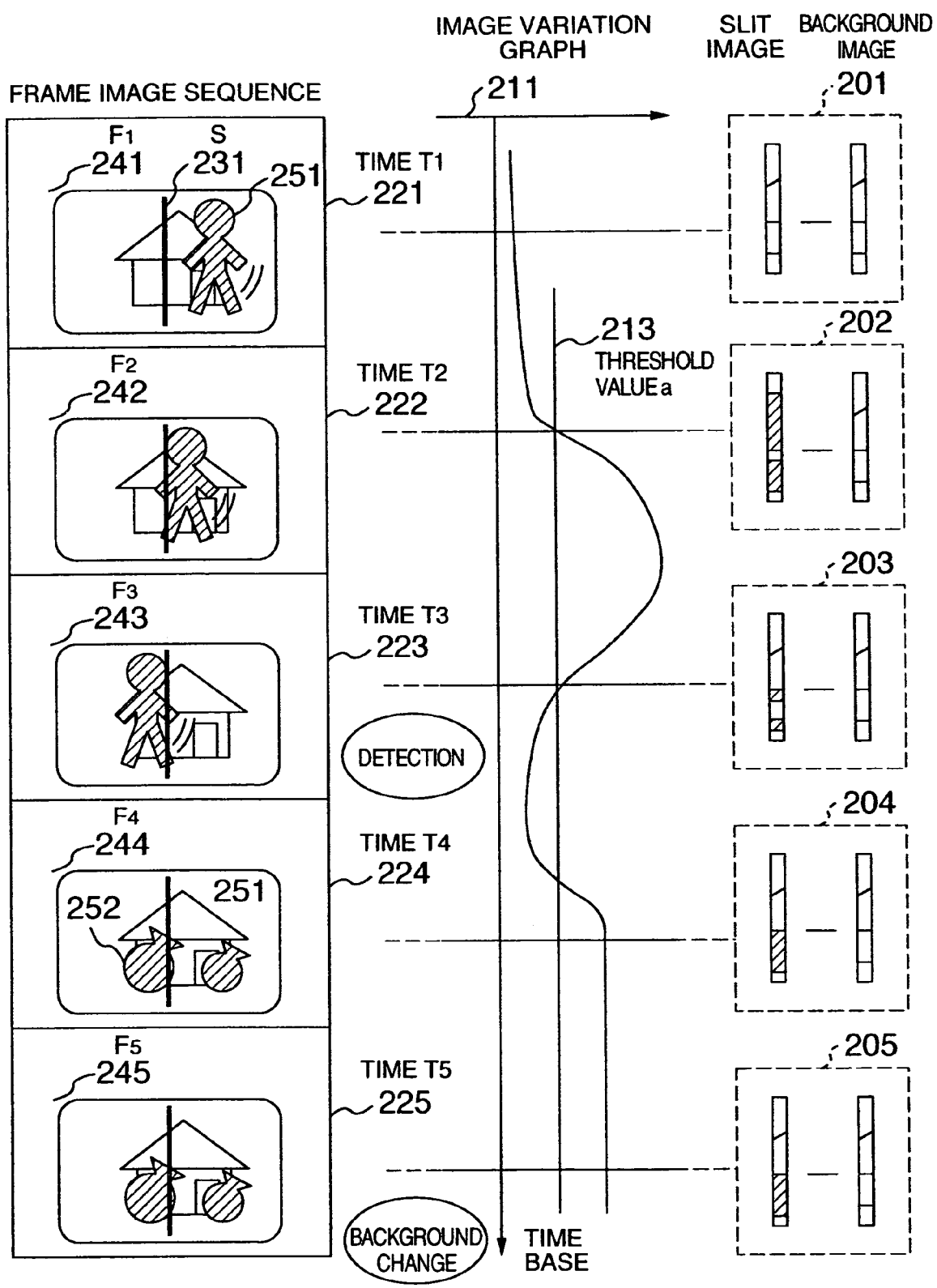
FIG. 2 shows an example showing how a moving object detecting means in FIG. 1 is realized.
Figure 3:
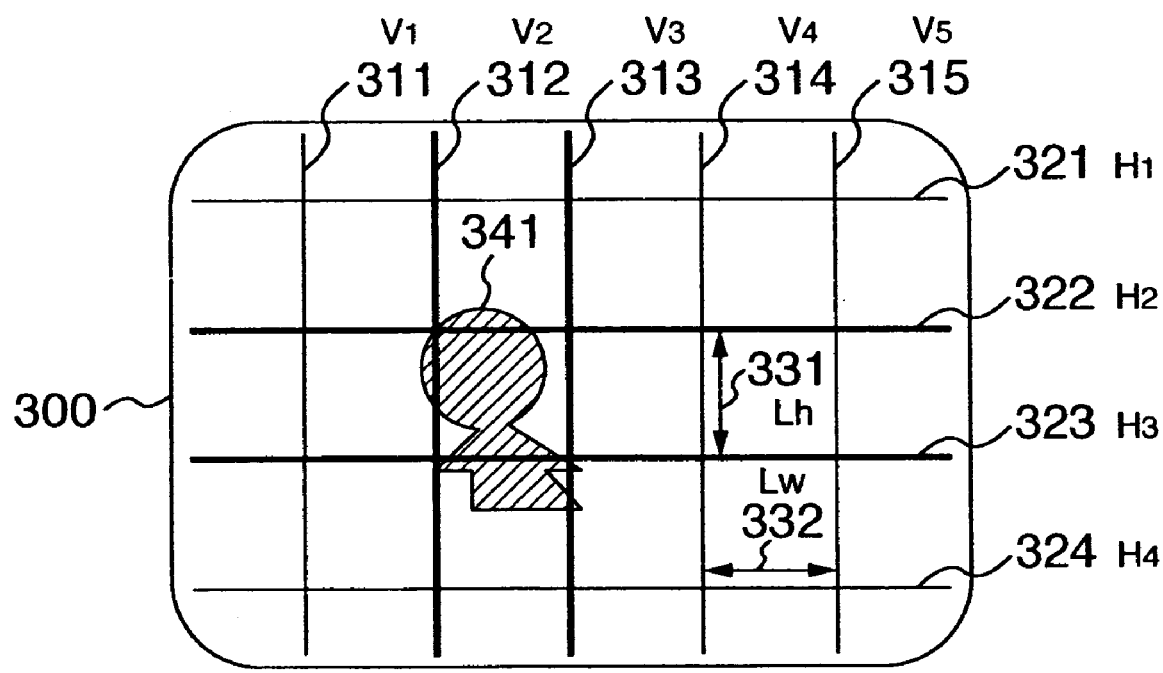
FIG. 3 shows an example of a moving object size detecting method in a means of making a combined decision on a moving object.

In this case, the images of the video camera (110) are input to the image input means (111). The read images in the image input means (111) are input, as a sequence of frame images that form pictures, to a moving object detecting means (113) installed in a detection position setting means (112) and are checked to see whether there is a moving object or not. Similarly, an image read into the image input means (111) is input to the i-th moving object detecting means i and checked for any moving object. The moving object detecting means 1(113) calculates correlation between data at the area of interest in a specified input frame and data at the area of interest in each frame, and from at least one pattern of correlation values, a decision is made as to a moving object detection event, such as presence or absence of a moving object or a change of the background image. To realize this, in this embodiment, the method shown in FIG. 2 is used, which has been described when prior art was mentioned. As moving object detection events that can be obtained as a pattern of correlation value to be output (114) from the moving object detecting means 1 (113), there are various events can be conceivable, such as a point in time when a moving object contacts the base line slit, or another point in time when a moving object comes out of the slit, or yet another point in time when the background has been changed.

To explain this using FIG. 2, the point in time when a moving object comes into contact with the slit can be detected as a point in time when the image structure variation becomes higher than the threshold value a (213) (time T2 (222), frame image F2 (242)). Similarly, the point in time when the moving object comes out of the slit can be detected, after the image structure variation exceeded the threshold value a (213), as a point in time when the image structure variation falls below the threshold value a (213) (time T3 (223), frame image F3 (243)). Again similarly, the point in time when the background has been changed is detected, after the image structure variation moved ahead of the threshold value a (213), as a time in point when the image structure variation remains flat for several seconds (for several frames) (time T5 (225), frame image F5 (245)).

In this embodiment, the video camera (110) is installed at a fixed position in such a way as facing the door of a convenience store or a vehicle. People pass a limited place such as the door of a convenience store or a vehicle. Therefore, the distance between the video camera (110) and each subject person is presumed to be almost the same at all times. For this reason, with the position where people walk through in mind, the base line and each partition are set as the area of interest to detect subjects.

Further in this embodiment, a detection position setting means (112) has an image defined by the base line and its partitions formed on the same straight line. The keyboard (115) and the mouse (116) are used to set the detection positions on an input image supplied as shown in FIG. 1. More specifically, in FIG. 7, when the areas of interest used by the definition lines, made up of the base line and its partitions, are to be arranged on the same line, the start point and end point of the base line V0 (710) are defined in the first place. Then, the partition V1 (721) through the partition V5 (725), being formed by dividing the base line V0 (710), are defined as follows.

With the partition V1 (721), its start point is set at the same position as the start point of the base line V0 (710) and its end point is defined anew. For the partition V2 (722), its start point is set at the same position as the end point of the partition V1 (721) and its own end point is defined anew. For the partition V3 (723), its start point is set at the same position as the end point of the partition 2 (722) and its own end point is defined anew. For the partition V4 (724), its start point is set at the same position as the end point of the partition V3 (723) and its own end point is defined afresh. For the partition V5 (725), its start point is set at the same position as the end point of the partition V4 (724) and its own end point is defined at the same point as the end point of the partition V0 (710). For clarity of illustration, those partitions are shown separately from the base line V0, but the lines V1 through V5 are actually located on the same position as the base line V0.

Referring to Table 701, description will now be made of the relation among the defined positions, the measurement code and the heights obtained by actual detection and measurement of heights. The base line V0 is defined as ranging from 0.0 m to 2.0 m, the partition V1 as ranging from 0.0 m to 1.6 m, the partition V2 as ranging from 1.6 m to 1.7 m, the partition V3 as ranging from 1.7 m to 1.8 m, the partition V4 as ranging from 1.8 m to 1.9 m, and the partition V5 as ranging from 1.9 m to 2.0 m. The types of detection in FIG. 5 obtained by the moving object detecting means in FIG. 2 are "before entry"=0 and "entry"=1. A detection type at the slit in each frame image is passed to a measurement code table in FIG. 6. Therefore, information about height in a measurement code "000000" is "before passing through", height information of a measurement code "110000" is "under 1.6 m", height information of a measurement code "111000" is "1.6 m or more and under 1.7 m", height information of a measurement code "111100" is "1.7 m or more and under 1.8 m", height information of a measurement code "111110" is "1.8 m or more and under 1.9 m" and height information of a measurement code "111111" is "1.9 m and over".

"Entry" and "before entry" have been outlined and will be described in detail with reference to FIG. 5.

FIG. 5 shows a sequence of moving object detection events (slit definition and detection information) contained in the moving object measuring and deciding means (101). The slit definition and detection information includes multiple pieces of moving object detection information, generated by the moving object detecting means, in a list structure. The slit definition and detection information has a start pointer 500 indicating a leading end thereof, and has a piece of moving object detection information as one element of the list structure, and has the respective elements concatenated by pointers. In the example in FIG. 5, the elements 501 and 502 here are event list elements, and the event list elements are chained together by the start pointer 500 and the next pointer area next (551) of an element 501 and so on. In this example, the base line corresponds to a means 1 of the slit ID (552) of the slit definition and detection information, and the partitions are assigned to means 2 through the last means of the slit definition and detection information.

The means 1, means 2 and so on denote the moving object detecting means 1 (113) . . . n (123).

The event lists (501), (502) and so on each correspond to one of the partitions V0 to V5 and they are chained together so that they can be searched sequentially by the pointers 551. Note that the black dots indicate the pointers in FIG. 5. By the slit ID (552), the base line and its partitions are given IDs, starting with means 1 for V0 and means 2 for V1 and so on. With regard to a detection type (553) when a moving object enters a slit of any slit No., information "entry=1" is written in the detection type field. If there is no moving object in the slit, information "before entry=0" is written. The image structure variation (554) is numerical representation of to what degree a moving object has entered the slit. If there is no moving object at all, the value 0 is written. As the quantity of a moving object that appears in the image in the slit increases, the value increases.

The definition mode (555) indicates whether the slit is defined as shown in FIG. 7 or as shown in FIG. 8. The number of partitions defined (556) indicates the number of partitions defined in the slit. In this example, the number is six, V0 to V5, so six is written.

The start point X (557) and the start point Y (558) indicate where the start point of the slit is located in the screen image. In the case of an event list (501), it is shown that the start point is set at a position 160 cm in the X direction and 5 cm in the Y direction from the origin (0,0) placed at the lower left corner of the screen. The end point X (559) and the end point Y (560) indicate the end point of the slit is at a position 160 cm in the X direction and 235 cm in the Y direction from the origin. In the case of an event list (502), the start point is located at a position 160 cm in the X direction and 180 cm in the Y direction from the origin, and the end point is located at a position 160 cm in the X direction and 235 cm in the Y direction from the origin. The those numeric values can be set from the keyboard 115. The latest slit image (561) is the pointer to a slit image (511) and the background slit image (562) is the pointer to a slit image (512) as the object to compare with. Further, the frame image (563) is the pointer to a frame image (513).

The measurement code, which was mentioned above, will be described in detail with reference to FIG. 6.

FIG. 6 shows an example of a measurement code table (600) used in the means for coding a detection result. From slit detection information, detection types (553) of the slit definition and detection information, which generates a measurement code on the base line and its partitions, are passed to a measurement code made from detection result. The number of digits of the measurement code table (600) is the number of partitions defined (556). It ought to be noted that the two types of detection are before entry (0 is set) and entry (1 is set). In this example, because the number of partitions defined is six, six detection types are passed from the slit detection information, more specifically, the detection type of the base line to the sixth digit and the detection types for the partitions 1 through 5 to the first to fifth digits of the measurement code.

Referring to the reference numerals, the structure of the measurement code table will be described. When a moving object is detected in any part of the range of the slit V0, 1 is set in bit (610). Similarly, when a moving object is detected in the range of the slit V1, 1 is set in bit (611). Hereinafter, similarly, when a moving object is detected in any other slit, 1 is set to the corresponding one of bit (612) to bit (615). Therefore, the measurement code table (600) is formed by a bit pattern, each bit representing entry or before entry.

FIGS. 7 and 8 show difference modes of embodiment, which have different ways of setting the partitions. Referring to FIG. 8, when the areas of interest used by the definition lines, including the base line and its partitions, which have varying lengths, are arranged on the same line superposed one on top of another. To begin with, the start point and the end point of the base line V0 (810) is defined. Then, the partitions from V1 (821) to V5 (825) are to be defined. Because those lines have the end points at the same position as the base line V0 (810), definition can be done in a manner described below. The partition V1 (821) is defined as having its start point at the same position as the start point of the base line V0 (810) and its end point at the same position as the end point of the base line V0 (810). The partition V2 (822) is defined as having its start point at a position that makes its length shorter than the partition V1 (821) and its end point at the same position as the end point of the base line V0 (810). The partition V3 (823) is defined as having its start point at a position that makes its length shorter than the partition V2 (822) and its end point at the same position as the end point of the base line V0 (810). The partition V4 (824) is defined as having its start point at a position that makes its length shorter than the partition V3 (823) and its end point at the same position as the end point of the base line V0 (810). The partition V5 (825) is defined as having its start point at a position that makes its length shorter than the partition V4 (824) and its end point at the same position as the end point of the base line V0 (810).

Referring to a table at 801, for example, description will be made of the relation among the defined positions, the measurement code and the heights obtained by actual detection and measurement of heights. The base line V0 is located from 0.0 m to 2.0 m, the partition V1 is located from 0.0 m to 2.0 m, the partition V2 is located from 1.6 m to 2.0 m, the partition V3 is located from 1.7 m to 2.0 m, the partition V4 is located from 1.8 m to 2.0 m, and the partition V5 is located from 1.9 m to 2.0 m. The detection types in FIG. 5 obtained by the moving object detecting means in FIG. 2 are before entry (0) and entry (1). The detection types of slit lines in each frame are passed to the measurement code table in FIG. 6. Therefore, information about height of a measurement code "000000" is "before passing through", height information of a measurement code "110000" is "under 1.6 m", height information of a measurement code "111000" is "1.6 m or more and under 1.7 m", height information of a measurement code "111100" is "1.7 m or more and under 1.8 m", height information of a measurement code "111110" is "1.8 m or more and under 1.9 m" and height information of a measurement code "111111" is "1.9 m and over.

Optimum frame information of the maximum image structure variation in detecting the base line, as shown in FIG. 4, for example, a period when a moving object is in contact with the slit is from a point in time when the image structure variation in FIG. 4 exceeds a certain threshold value a (413) (frame image F2 (442)) until the moving object gets out of the slit, in other words, until a point in time when the image structure variation falls below the threshold value a (413)(frame image F4 (444)). More specifically, by comparison of the image structure variations of the adjacent frames in the above-mentioned period, information about the point in time when the image structure variation is greatest (frame image F3 (443)) can be obtained.

The moving object detecting means 1 (113) to n (123) passes detected moving object detection events along with moving object detection information, such as kinds of moving object detection events and frame images in which detection occurred, to the moving object measuring and deciding means (101).

Moving object detection information in this example, as shown in one element (501) of slit definition and detection information in FIG. 5, includes an identifier id (552) of the moving object detecting means (hereafter referred to as slit ID, realized by a character string), a type (553) of a moving object detection event detected at the time of contact with the slit or a change of the background, the image structure variation ci (554) in each frame image, a mode (555) (setting partitioning points or starting points) of defining the base line as partitions, the number ti (556) of the defined base line and partitions, the start points X xbi (557) of the base line and its partitions, the start points Y ybi (558) of the base line and its partitions, the end points X xbi (559) of the base line and its partitions, the end points Y ybi (560) of the base line and its partitions, the slit image slit (561) and the background image bgr (562) used for the moving object detection process, and the frame image img (563).

In this example, the slit image slit (561), the background image bgr (562) and the frame image img (563) are realized as pointers to actual image data and they point to the images 511, 512 and 513.

Moving object detection events and accompanying moving object detection information (114, 124, etc.) output from the moving object detecting means are coded by the moving object measuring and deciding means 101, compared with a preset measurement code, and decision results are output as advanced moving object detection events (102). The result output means (103) supplies the user with final moving object detection and measurement results obtained from advanced moving object detection events (102) through a display unit (104) or a speaker (105).

In this example, the above-mentioned moving object detection and measuring apparatus (100) is realized by a computer formed by a memory, an input/output device, and an arithmetic unit.

Following the steps starting with step 900 in FIG. 9, description will be made of a procedure for arranging the areas of interest used by the definition lines, including the base line and its partitions in FIG. 8, on the same line by having those lines varying superposed one on top of another with their lengths varying from the reference point.

Detection information about the slit of the base line and its partitions is obtained from each frame (901). A decision is made whether the detection type of the base line is entry or not (902). If not entry, all digits of the measurement code are set to 0 (903). Information of "before entry" is passed to the result output means (904), and slit detection information of the next frame is obtained. If the detection type is entry, a measurement code shown in FIG. 6 is generated from the detection information of the slit of the base line and its partitions (905). Then, a decision is made whether the image structure variation of the base line shown in FIG. 5 is greatest or not (906). If the variation is not greatest, detection information about the slit of the next frame is obtained. If it is greatest, information about the relation among detected information, the preset measurement code and the preset measurement code is obtained (907). Next, a decision is made whether the detected measurement code is the same with the preset measurement code or not (908). If not the same, the next preset measurement code and information about height are obtained. If the codes are the same, measurement information about comparison results is passed to the result output means (103) (909). Finally, a decision is made whether there is no more frame image (910). If there is some frame image remaining, slit detection information of the next frame is obtained. If no more frame image remains, this procedure is finished. Output of the result output means (103) is shown on the display (104), and supplied to a speaker, a printer or an external output means (105) as transmission equipment to a remote place. According to a result by the measuring and deciding means, the external output means outputs a result on the display or issues a warning or guidance.

Note that information about preset measurement codes and heights is prepared for each measurement code and stored as table data. A measurement code obtained from detection information is compared with a preset measurement code. How a measurement code is set will be described in detail in the following embodiment.

Figure 10:
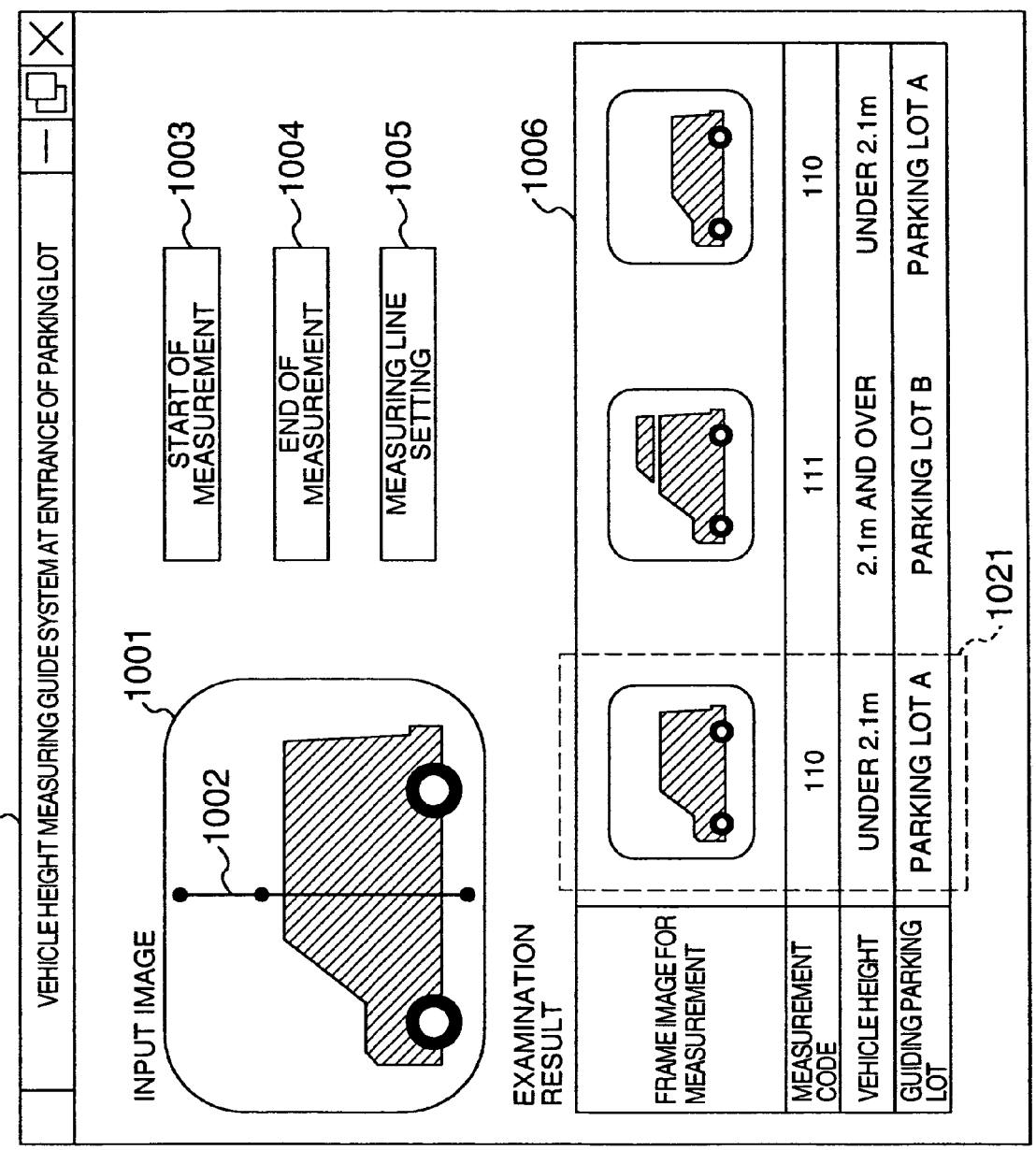
FIG. 10 shows an example of a screen image of a vehicle height measuring guide system at the entrance of a parking lot.

As another embodiment of the present invention, description will be made of an example of a result output method of detection, measurement and decision at a slit made of one base line and two partitions that define an image and also of an example of slit definition. FIG. 10 shows an example of a screen image for defining the base line and two partitions, measuring the height of a vehicle and displaying a parking lot specified.

This example shows a case of examining the height of an automobile. A video camera is installed facing a very limited space where automobiles pass through at the entrance of a parking lot, for example. Therefore, the distance and the positional relation of the video camera with respect to automobiles is assumed to be almost constant.

Figure 11:
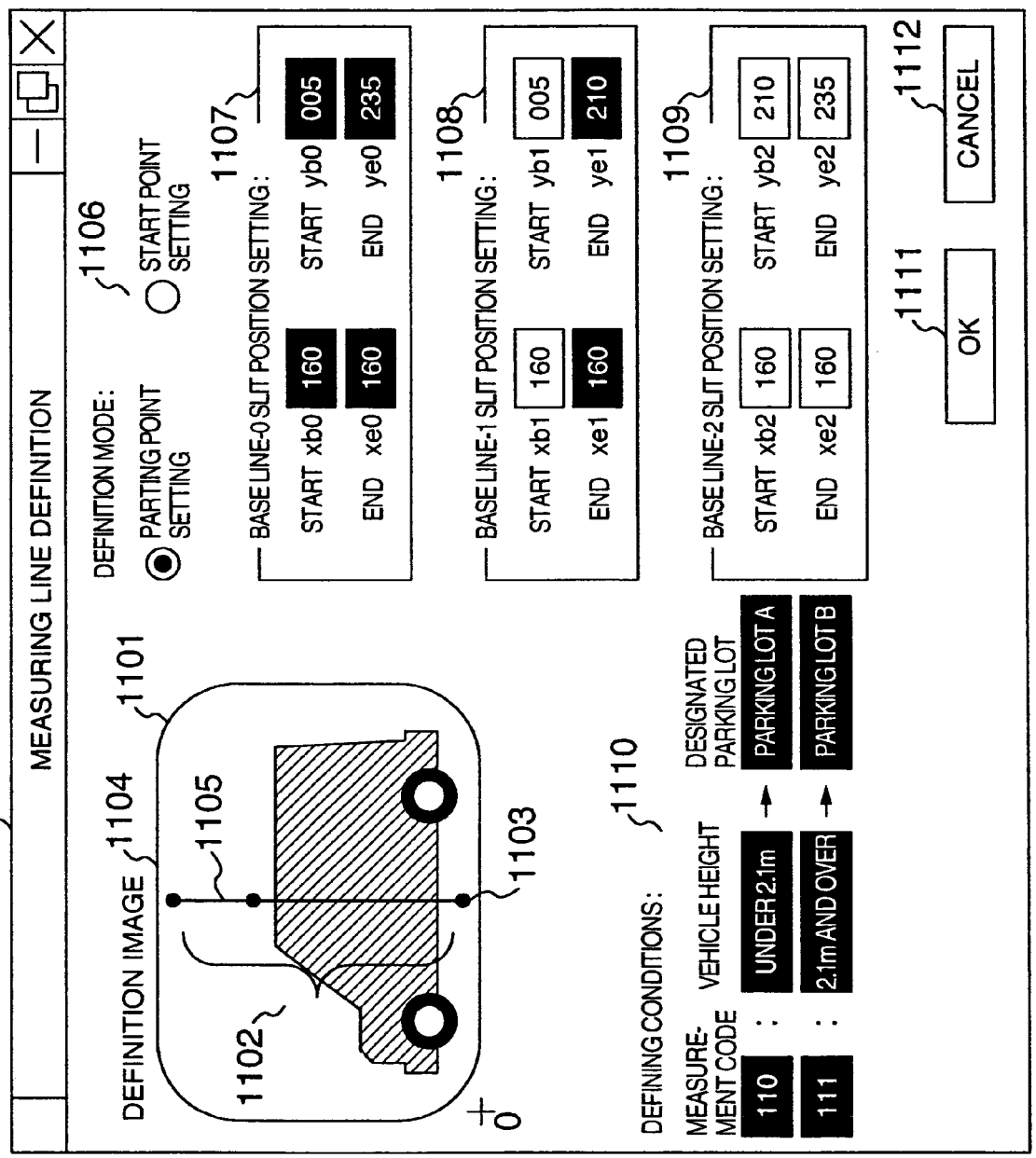
FIG. 11 shows an example of a screen image specifying the partitioning points for the base line and its partitions.
Figure 12:
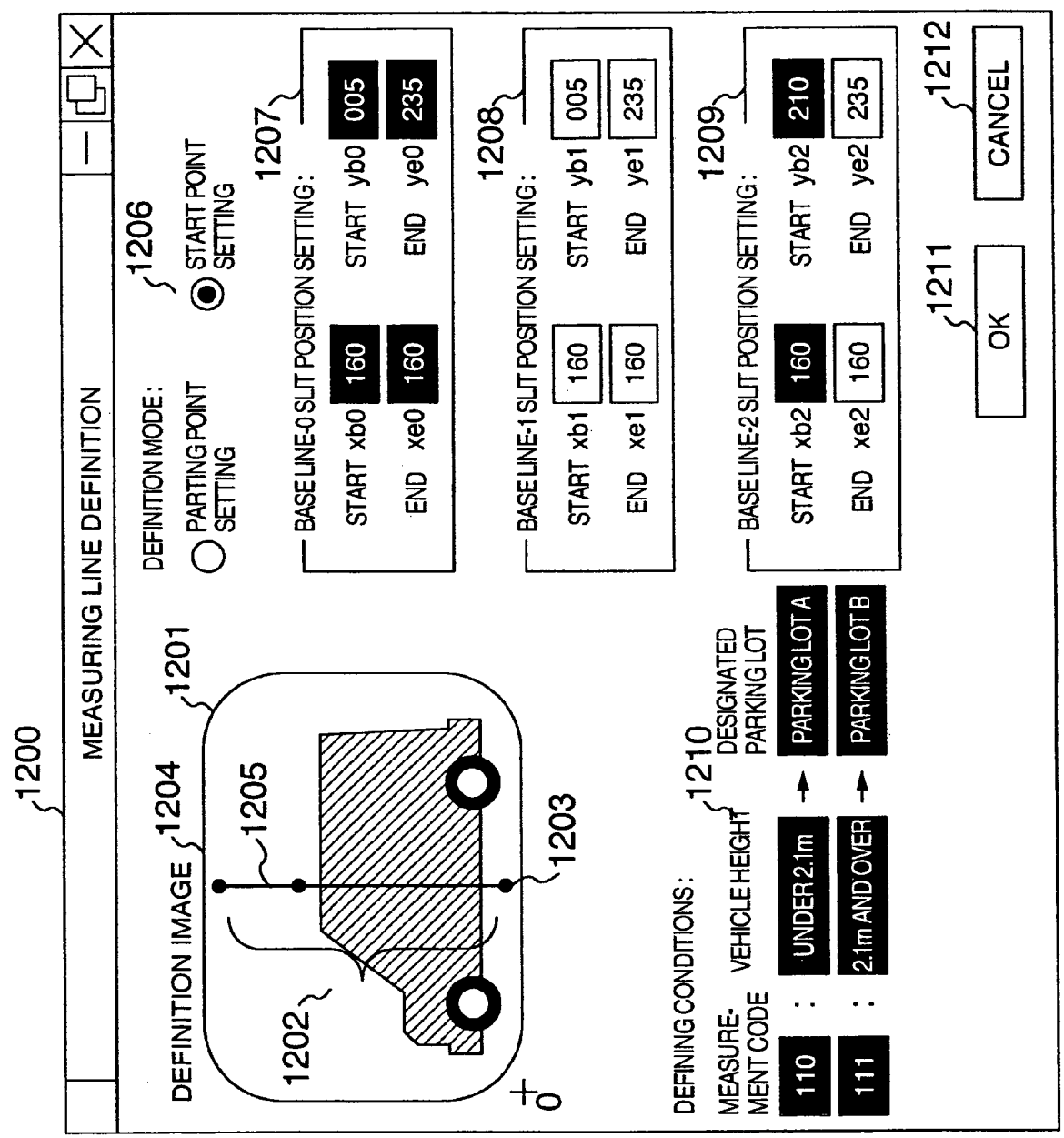
FIG. 12 shows an example of a screen image specifying the starting point for the base line and its partitions.
Figure 13A:
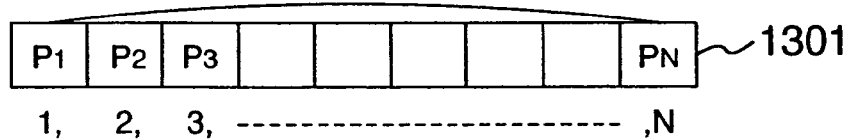
FIGS. 13A, 13B and 13C are examples of diagrams for explaining the effects of changes in illuminance on the slit images.
Figure 13B:
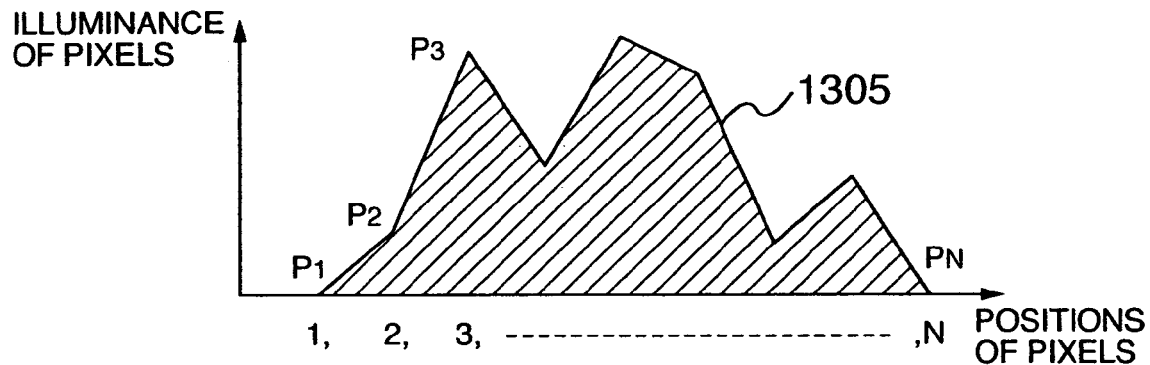
Figure 13C:
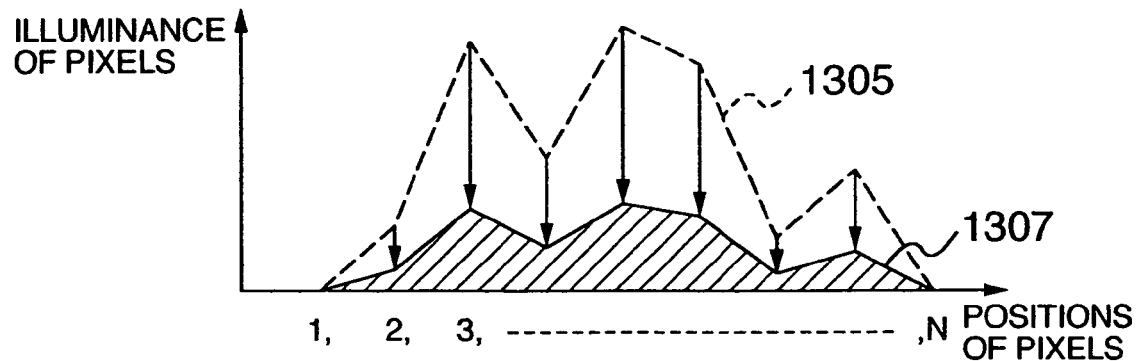
Figure 15:
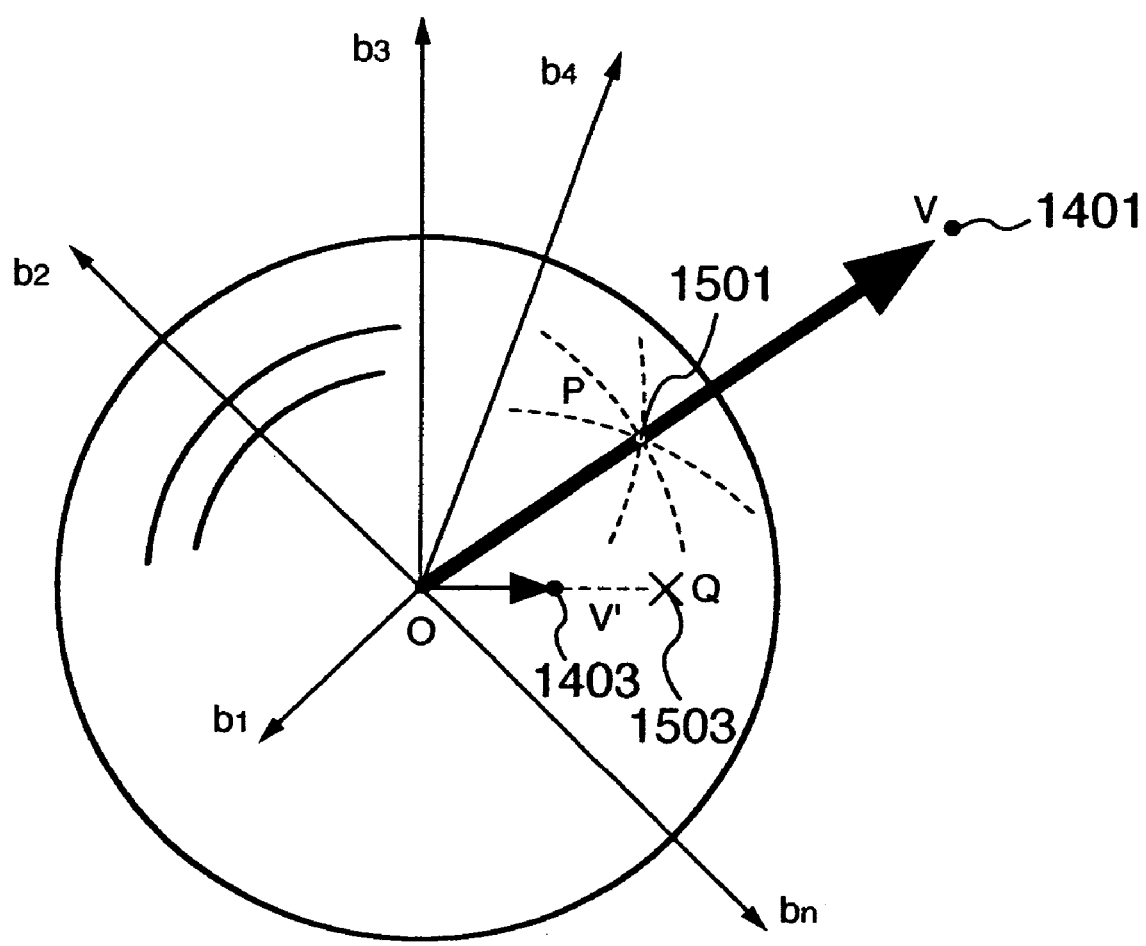
FIG. 15 shows an example of a diagram showing mapping on a unit sphere of a normal slit vector and a slit vector affected by a change in illuminance.

FIG. 11 shows an example of a screen image, in which the area of interest used with the definition lines, including the base line and its partitions, are arranged on the same line and the displayed items of the measurement code are set. FIG. 12 shows an example of a screen image, in which the areas of interest used with the definition lines, including the base line and its partitions, which have varying lengths, are arranged on the same line superposed one on top of another, and the displayed items of the measurement code are set.

FIG. 10 shows a screen image of results output by the detection and measuring apparatus of the slit made of the base line and its partitions for defining an image. The window (1000) is an area showing the results displayed by a computer, for example. The window (1000) includes an area (1001) showing an input image, a measure start button (1003) that initiates measurement of the height of a moving object, an examine end button (1004) for terminating the examination, a measuring line set button (1005) for setting a measuring line, a selected slit (1002) in the input image (1001), and an area (1006) for showing a measurement result for each vehicle by a frame image that shows a measurement code and the height of a moving object, a parking lot specified, etc. The selection of the position of the slit (1002) in the input image (1001) will be described in detail with reference to FIGS. 11 and 12. When the measure start button (1003) is depressed, the measuring process of the height of a moving object starts. When the measure end button (1004) is depressed, the measuring process is finished.

The measuring process will be described briefly. At the start of measurement, it is assumed that the frame image, measurement code, vehicle height, and a parking lot designated in the measurement result area (1006) are initialized and blank. Afterward, each time a moving object is detected (in a frame when the image structure variation is greatest), the moving object detection and measurement information is added to the measurement result area (1006) on the display screen.

In this embodiment, when moving object detection information is displayed, as shown at 1021 in FIG. 10, the measured frame image, measurement code, vehicle height, and a parking lot designated are arranged from top down in this order.

In the process of outputting moving object detection and measurement results, it may be further arranged that to issue a warning based on the measurement code, the characters in the measurement result area (1006) or its square frame flickers or a speaker is used to draw attention.

Description will then be made of a screen image, in which the areas of interest used by the definition lines, including the base line and its partitions, in FIG. 11 are arranged on the same line superposed one on top of another, and the displayed items of the measurement code are set. The window (1100) is an area where the displayed items of the slit and the measurement code are set from a computer, for example.

The window (1100) includes an area (1101) for showing a definition image, a check box (1106) for selecting a definition mode to set a definition method, the edit boxes (1107) capable of inputting the coordinates of the base line-0 slit, the edit boxes (1108) capable of inputting the coordinates of the partition-1 slit, the edit boxes (1109) capable of inputting the coordinates of the partition-2 slit, the edit boxes (1110) capable of inputting the defining conditions, such as the measurement code, vehicle height and a parking lot designated, the OK button (1111) that represents reflection of the setting, and the cancel button (1112) to cancel the setting. The definition image display area (1101) shows the currently selected slit (1102), and the start point and the end point (1103, 1104, 1105) on the slit are highlighted by dots. The check box (1106) to select a definition mode is so designed as to select either a partitioning point or a start point.

In this screen image, it is arranged that one base line and two partitions can be set on the slit. Next, the operation of the screen image will be outlined. The items written with white letters on the dark background indicate the items to be input. By selecting the partitioning point setting (corresponding to the slit setting method in FIG. 7) in the definition mode check box (1106), it becomes impossible to input the coordinates of the start point in the edit boxes (1108), which is normally capable of inputting the coordinates of the partition-1 slit and it also becomes impossible to input the coordinates of the start point and the end point of the edit boxes (1109), which is capable of inputting the coordinates of the partition-2. The reason is as follows: when the other coordinate values are set, those coordinates are automatically set and therefore need not be input.

If the origin (0,0) of coordinates of the base line-0 slit is located at the lower left corner of the screen and if X=160 and Y=005 are input as the coordinates of the start point of the edit boxes (1107) capable of inputting numeric values, this setting is automatically reflected in the coordinates of the start point of the edit boxes (1108) capable of inputting coordinates of the partition-1 slit. When X=160 and Y=235 are input as the coordinates of the end point of the edit boxes (1107) capable of inputting coordinates of the base line-0 slit, this setting is automatically reflected in the coordinates of the end point of the edit boxes (1109) capable of inputting coordinates of the partition-2 slit. When X=160 and Y=210 are input as the coordinates of the end point of the edit boxes (1108) capable of inputting coordinates of the partition-1 slit, this setting is automatically reflected in the coordinates of the start point of the edit boxes (1109) capable of inputting coordinates of the partition-2 slit.

(In this example, after measurement, the distance between the start point (1103) and the end point (1104) of the base line-0 slit is set at "2.3 m" and the distance between the start point (1103) and the partitioning point (1105) of the base line-0 slit is set at "2.05 m". In this example, cars are assigned to different parking areas by classifying them at a partitioning point of 210 cm vehicle height. This value can be decided arbitrarily.)

Data is input in the edit boxes (1110) capable of inputting the defining conditions, such as a measurement code, a vehicle height and a designated parking lot. In the 3-bit measurement code, entry is denoted by 1 and before entry is denoted by 0. Because the left bit of the three bits corresponds to the base line-0 slit, the center bit corresponds to the partition-1 slit and the right bit corresponds to the partition-2 slit, a 3-bit measurement code 110, for example, constitutes an instruction to guide a car to a parking lot A that allows parking of vehicles with a height of less than 2.1 m. Further, another measurement code 111 constitutes an instruction to guide a car to a parking lot B that allows parking of vehicles with a height of 2.1 m and over.

Description will be made of a screen image, in which the areas of interest used by the definition lines, including the base line and its partitions in FIG. 12, which have varying lengths, are arranged on the same line superposed one on top of another, and the displayed items of the measurement code are set. Those areas of interest correspond to the slits shown in FIG. 8. In FIG. 12, as in FIG. 11, the items written with white letters on the dark background indicate the items to be input. The window (1200) is formed in the same pattern as a screen image in the window (1100) in FIG. 11, in which the area of interest used with the definition lines, including the base line and its partitions, are arranged on the same line and the displayed items of the measurement code are set.

In this screen image, the conditions for slits of the base line and two partitions can be set. The operation of the screen image will be outlined. By setting the start point at the definition mode check box (1206), it becomes impossible to input the coordinates of the start point and the end point in the edit boxes (1208), which is normally capable of inputting the coordinates of the partition-1 slit, and it becomes impossible to input the coordinates of the end point in the edit boxes (1109), which is normally capable of inputting the coordinates of the partition-2 slit.

If the origin (0,0) is located at the lower left corner of the screen and if X=160 and Y=005 are input as the coordinates of the start point in the edit boxes (1207) capable of inputting the coordinates of the base line-0 slit, this setting is automatically reflected in the coordinates of the start point of the edit boxes (1208) capable of inputting the coordinates of the partition-1 slit. If X=160 and Y=235 are input as the coordinates of the end point of the edit boxes (1207) capable of inputting the coordinates of the base line-0 slit, this will be automatically reflected in the coordinates of the end point of the edit boxes (1208) capable of inputting the coordinates of the partition-1 slit and also in the coordinates of end point of the edit boxes (1209) capable of inputting the coordinates of the partition-2-slit. X=160 and Y=210 are input as the coordinates of the start point of the edit boxes (1109) capable of inputting the partition-2 slit. (In this example, based on measurements, the distance between the start point (1203) and the end point (1204) of the base line-0 slit is set at "2.3 m" and the distance between the start point (1203) of the base line-0 slit and the start point (1205) of the partition-2 slit is set at "2.05 m".

Then, data is input in the edit boxes capable of inputting the defining conditions, such as a measurement code, a vehicle height, a designated parking lot. In this 3-bit measurement code, entry is denoted by 1 and before entry by 0. The left bit corresponds to the base line-0 slit, the center bit corresponds to the partition-1 slit and the right bit corresponds to the partition-2 slit. Accordingly, a measurement code 110 constitutes an instruction to guide to a parking lot A that allows parking of vehicles with a height of less than 2.1 m. Another measurement code 111 constitutes an instruction to guide to a parking lot B that allows parking of vehicles with a height of less than 2.1 m.

The slit position information used in this embodiment is stored in the slit definition and detection information shown in FIG. 5. The information (501) about the base line-0 slit is a list pointed by the start pointer (500) of the slit definition and detection information. The coordinates of the start point are stored in the start point X (557) and the start point Y (558). The coordinates of the end point are stored in the end point X (559) and the end point Y (560). Information about (502) about the partition-1 slit contains the coordinates of the start point and the end point of the partitioned slit-0 in a list pointed by the pointer (551) of the information (501)

of the base line-0 slit. Information (502) of the partition-1 slit has the pointer pointing to the partition-2 slit.

An applied example of the present invention is shown as follows. A video camera is installed overhead at the entrance for automobiles to take pictures of their roofs. The above-mentioned slit is provided at right angles with the longitudinal direction of a car, which makes it possible to estimate the width of the car. By this arrangement, stopping the advancing car or guiding to an appropriate route can be done automatically.

According to the present invention, it is possible to provide, in a screen image, defining means along a straight line, consisting of the base line and its partitions and also provide a plurality of defined areas of interest for monitoring, so that it becomes possible to accurately measure the height of a moving object in an input image, including video camera images, efficiently and easily.

What is claimed is:

1. A moving object detecting and measuring apparatus formed by using a computer, comprising:
    a first moving object detector having a first detecting area defined on an input image;
    at least one second moving object detector having a second detecting area defined on an input image;
    a moving object measurer for determining a length of said moving object passing through areas in a longitudinal direction of said first and second detecting areas according to outputs of said first and second moving object detectors; and
    a code generator for generating a measurement code according to outputs of said first and second moving object detectors,
    wherein each of said first and second detecting areas outputs a signal on the basis of image structure variations, and
    wherein said moving object measurer determines a length of said moving object by comparing said measurement code with information about length previously input.

2. A moving object detecting and measuring apparatus formed by using a computer, comprising:
    a first moving object detector having a first detecting area defined on an input image;
    at least one second moving object detector having a second detecting area defined on an input image; and
    a moving object measurer for determining a length of said moving object passing through areas in a longitudinal direction of said first and second detecting areas according to outputs of said first and second moving object detectors,
    wherein each of said first and second detecting areas is defined in a shape of slit, and
    wherein said first detecting area is different in length from said second detecting area.

3. A moving object detecting and measuring apparatus according to claim 2, wherein said first and second detecting areas in a shape of a slit are arranged on a straight line and output a first value when said moving object has entered said first and second detecting areas and output a second value when said moving object has not entered said first and second detecting areas, on the basis of image structure variations, and
    wherein said moving object detecting and measuring apparatus further comprise a code generator for generating a measurement code according to outputs of said first and second moving object detectors,
    wherein said moving object measurer determines said length of said moving object by comparing said measurement code with information about a previously input length.

* * * * *